United States Patent [19]

Spencer

[11] 4,006,924
[45] Feb. 8, 1977

[54] SWIVEL OR ROTATING COUPLING

[76] Inventor: Audley V. Spencer, 5001 S. "C", Oxnard, Calif. 93030

[22] Filed: Oct. 14, 1975

[21] Appl. No.: 621,871

[52] U.S. Cl. .............................. 285/190; 285/279; 285/98

[51] Int. Cl.² ................... F16L 5/00; F16L 27/00; F16L 41/00

[58] Field of Search ............ 285/190, 98, 278, 279, 285/280, 281, DIG. 1

[56] References Cited

UNITED STATES PATENTS

| | | | |
|---|---|---|---|
| 2,635,008 | 4/1953 | Nelson | 285/278 X |
| 2,712,457 | 7/1955 | Kimbro | 285/278 |
| 3,776,578 | 12/1973 | Jessup et al. | 285/98 X |
| 3,937,494 | 2/1976 | Hicks | 285/281 X |

Primary Examiner—Wayne L. Shedd
Attorney, Agent, or Firm—Dennis L. Mangrum

[57] ABSTRACT

The present invention is a swivel coupling. The coupling provides an effective seal by utilizing the fluid pressure present in the coupling. The fluid exerts pressure against one component of the coupling forcing it to seal against another component while permitting complete rotation of those components.

4 Claims, 4 Drawing Figures

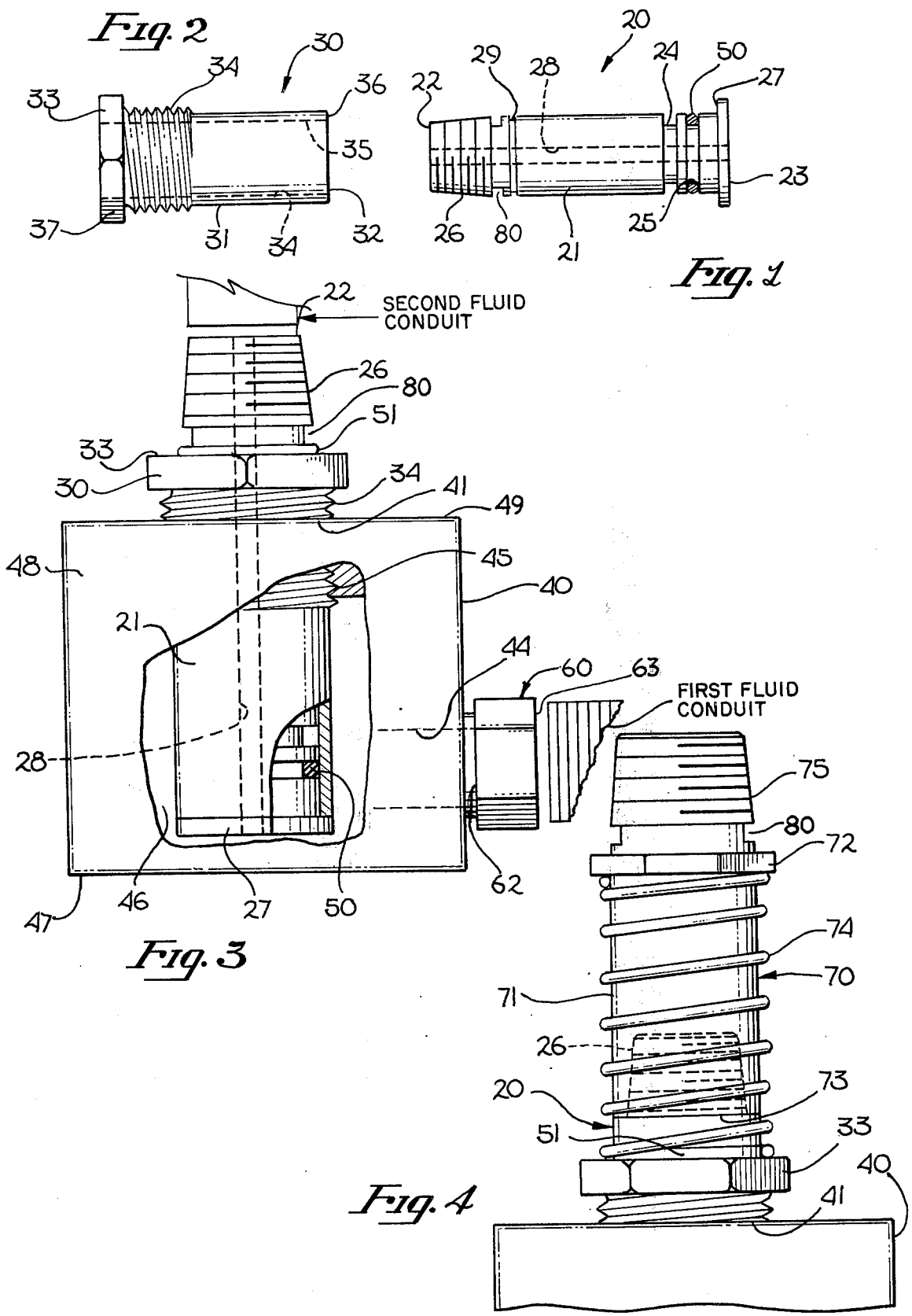

SWIVEL OR ROTATING COUPLING

BACKGROUND OF THE INVENTION

1. Field of the Invention

This invention relates to a coupling for fluid conduits which permits swiveling or rotating of one member in relation to another member.

2. Prior Art

Coupling for permitting rotation of one fluid conduit in relation to a second coupled conduit are well known in the prior art. However, all known prior art swiveling coupling deteriorate and become useless in a very short time period. The prior art coupling are of a complex design, relatively expensive to manufacture and replacement costs are high. The present invention overcomes these problems by providing an inexpensive swiveling coupling which has an indefinite life span.

All known rotating or swiveling coupling are comprised of six independent parts: a housing, a bushing, two O-rings, a lock ring, and a fastener for connection to a fluid conduit. The bushing of these devices is constructed such that one end is adapted to be fastened to a first fluid conduit. The bushing has an aperture bored therein which permits fluid flow therethrough. The bore extends partway into the bushing and is terminated at a perpendicular bore which extends laterally through the bushing. Hence, fluid will flow through the bushing and exit through the perpendicular boring. The bushing is constructed such that an O-ring may be disposed on either side of the laterally extending bore. The end of the bushing opposite the adaptor coupling is constructed to receive a locking ring, lockwasher or other means for securing position of the bushing once disposed in the housing. The housing has a bore extending completely therethrough with a diameter slightly larger than the outer diameter of the bushing. A laterally extending bore extends perpendicularly into the housing to permit coupling of a second fluid conduit thereto. In this manner the bushing may be disposed within the housing. The O-rings prevent fluid from flowing between the bushing and housing. The bushing is held in place in the housing by means of a lockring coupled to one end of the bushing. The bushing is thusly capable of rotating within the housing while permitting fluid to pass therethrough.

Prior art valves of this type have several basic flaws. First, the O-rings deteriorate and become ineffective in use. Second, the construction of the bushing is such that only a small bearing area exists between the bushing and housing. The O-rings wear out through use and deteriorate. This causes the valve to leak and causes failure of the coupling. In these prior art coupling, a certain amount of leakage will occur regardless of the condition of the O-rings. The leakage causes rusting of the bushing, housing and/or the locking ring. The prior art coupling are normally fabricated from steel or cast iron and normal use and leakage soon cause the valve to become inoperative.

The present invention solves these problems by providing a coupling assembly which will not rust or corrode, which is inexpensive to manufacture and has an indefinite life span.

SUMMARY OF THE INVENTION

A coupling which permits free rotation while providing an effective seal is disclosed. The invented coupling includes a piston which is disposed through a bushing which is coupled to a housing. The piston rotates freely in relation to the bushing and housing. Fluid passing through the piston into the housing exerts pressure, driving the piston against the bushing thereby forming a seal while permitting freedom of rotation of the piston in relation to the bushing and housing.

It is an object of the present invention to provide a coupling which can be employed in situations where one fluid conduit is required to rotate in relation to another fluid conduit.

It is still another object of the present invention to provide a coupling which will form an effective seal for preventing leakage of fluid from the coupling.

It is still another object of the present invention to provide a swivel coupling which will not wear out through use and has an indefinite lifespan.

It is an object of the present invention to provide a swivel coupling which will not corrode from normal usage and can be used in corrosive fluid applications.

BRIEF DESCRIPTION OF THE DRAWINGS

FIG. 1 is a side elevation view of the bushing portion of the present invention.

FIG. 2 is a side elevation view of the body portion of the valve of the present invention.

FIG. 3 is a pictorial view partially broken away illustrating the coupling of the present invention disposed within a housing illustrating the application and use of the coupling of the present invention.

FIG. 4 is a side elevation view of an alternate embodiment having a spring operated seal.

DETAILED DESCRIPTION OF THE PREFERRED EMBODIMENT

Referring first to FIG. 3 the swivel coupling of the present invention is shown assembled. In the preferred form of the present invention, the swivel coupling is comprised of four basic parts: a piston 20, a bushing 30, a housing 40 and a coupling 60. Each of those basic components will be described in detail hereinafter.

Referring now to FIG. 1 the piston 20 is shown. The piston 20 is generally cylindrical in shape. The body portion 21 extends between end 22 and end 23. In the preferred form end 22 is threaded with threads 26 which are capable of being coupled to a first fluid conduit. The diameter of end 23 is slightly larger than the body portion 21 of piston 20. The difference in diameters of end 23 and body 21 forms an annular ridge 27. Two annular shaped grooves 24 and 25 disposed near end 23 of body 21. The piston 20 has a bore 28 extending through the length of piston 20 (FIG. 1). In the preferred form an annular groove 29 is also formed near end 22 of body 21. The particular use and function of each of the feature of the piston 20 will be described after each of the individual components have been physically described.

Referring now to FIG. 2, the bushing 30 is illustrated. The bushing 30 has a body portion 31 which is basically a thin-walled cylinder. The inner diameter 34 is slightly larger than the outer diameter of body 21 of piston 20. Thus, there extends a cylindrical opening 35 completely through bushing 30. This formation creates a smooth, flat face 36 on end 32 which is annular in shape. End 33 of bushing 30 has formed thereon threads 34 and nut 37.

The housing 40 in the preferred embodiment is illustrated in FIG. 3 and will now be described. The body 48 of the housing 40 extends between ends 47 and ends 49. The body may be configured in many shapes, such as cylinder, a square, but in the preferred embodiment, the housing is hexagonal in shape, in order that it may be grasped or held by a wrench. End 47 of housing 40 is solid while end 49 has a bore 41 disposed therethrough. Bore 41 extends vertically through the body 48 of the housing 40 terminating near end 47. The upper end of bore 41 has threads 45 disposed therein which are capable of engaging with threads 34 of bushing 30. An aperture 44 is cut laterally through body 48 of the housing and extends from the face of the body to bore 41. A fastening member 60 is joined to the body 48 of housing 40 by welding or other means over aperture 44. The fastening member has an aperture 62 extending therethrough. The head 63 of the fastening member is formed so as to be able to be joined to a second fluid conduit.

Having now described the preferred form of the basic components of the basic invention, their function, assemblage and use will now be described. An O-ring 50 is initially disposed in the annular groove 25. The piston is then disposed through bushing 30 by first sliding end 22 of piston 20 into end 32 of bushing 30. The piston will slide completely through bushing 30 until face 36 of bushing 30 engages ridge 27 of end 23 of the piston. At this point the annular groove 29 in piston 20 will be disposed slightly above end 33 of the bushing 30 and the lock ring 51 can be used to secure the bushing and piston. The piston 20 can now be coupled to an incoming fluid conduit by threading end 22 into a mating coupling of the fluid conduit. The piston can be held in position during fastening by a wrench or slots 80 may be cut into piston 20, a technique well known in the art. The fluid in the fluid conduit will flow through the conduit into bore 28 of piston 20.

The piston and bushing as assembled freely rotate in relation to each other. The assembled piston and bushing are next disposed into bore 41 of housing 40 and a wrench used to tighten the bushing 30 securely to housing 40 as threads 34 of bushing 30 engage threads 45 of the housing. Once the bushing is firmly in place into housing 40 as shown in FIG. 3 the outlet fluid conduit may be joined to fastening member 60. This completes assemblage of the swivel coupling of the present invention.

The coupling of the present invention as illustrated and heretofore described permits rotation and effectively forms a seal because incoming fluid will pass through bore 28 of the piston and flow into bore 41 of the housing 40. At this point the fluid in bore 41 will exert a pressure against end 23 of the piston driving the piston such that ridge 27 of the piston engages the face 36 of the bushing. This seals the piston and bushing and prevents the fluid from escaping therebetween. The coupling is particularly useful in high pressure application since the greater the pressure exerted by the fluid the greater the pressure forming the seal between the piston and the bushing. The fluid may then flow through bore 44 and fastening member 60 into the outgoing fluid conduit.

In the preferred form of the present invention, an O-ring 50 is disposed into aperture 25 of the piston. This O-ring is for backup purposes only and is not required in order to insure an effective seal between the piston and bushing since the seal is formed by pressure forcing engagement of ridge 27 and face 36. However, the O-ring in the present invention serves as a backup and safety feature which is desirable.

In the preferred form, annular groove 24 in piston 20 is used for lubricant. Prior to assembly, lubricant, like heavy grease, may be disposed therein. This grease or lubricant will freely permit the piston 20 to rotate in relation to bushing 30. However, it should be understood that the present invention need not have either annular groove 24 or 25. The seal is effective without the O-ring and rotation will be permitted and accomplished without lubricant in groove 24.

The couplings of the prior art are formed completely from steel and corrode very easily thereby making the parts inoperative. The present invention could be formed from steel, iron or other suitable material. However, in the preferred form the piston 20 is formed from stainless steel to prevent rusting and corrosion. The bushing 30 of the present invention in its preferred form is formed from brass for similar reasons. However, it could equally as well be formed from any other material. The remaining portions of the heretofore described coupling in the preferred form are fabricated from steel as are the prior art devices. However, they could be formed from other materials. The coupling of the present invention is very effective and has an indefinite life. It rotates or swivels while permitting complete and effective sealing of the fluid in the coupling. The elongated body portion 21 of piston 20 has a considerable bearing area engaging the inner diameter of bushing 30. The substantial bearing area provides for effective sealing of the ridge 27 and face 36 and will permit long and useful service of the coupling.

In an alternate embodiment, the coupling may be used where very low pressure lines are employed. The first alternate embodiment is described in reference to FIG. 4. There, a union 70 is coupled to piston 20 by means of engaging end 73 with end 22 and threads 26 of piston 20. The coupling 70 has a body 71 around which a coiled spring 74 is disposed. The spring 74 is compressed between end 33 of bushing 30 and nuthead 72 of coupling 70. The spring is so formed that as coupling 70 is screwed onto piston 20 the spring will compress thereby exerting the pressure against the end of bushing 30 which forces piston 20 to be driven upward thereby exerting a force against the piston 20 and bushing 30 at the engagement point of the ridge 27 and face 36. The spring can exert sufficient force to provide an effective seal. In most applications, the spring is not required as the seal is effectively formed even at most low pressures. In addition, the O-ring will provide backup and prevent any leakage. However, in very low pressure applications, the union 70 may be beneficial.

The present invention is particularly useful in high pressure applications. The prior art coupling were ineffective for high pressure lines. However, the seal of the present invention becomes better as the pressure increases.

It should also be understood that the coupling of the present invention could be employed in cases where more than one fluid conduit is joined together at a swiveling coupling.

The coupling of the present invention may be particularly useful in applications of corrosive fluids. The coupling does not require O-rings but only pressure to form the seal. Hence, corrosive fluids will not destroy the sealing ability of the coupling.

However, while the preferred embodiment of the present invention has been described in detail herein, it will be understood by those skilled in the art that various changes in forms and detail may be made therein without departing from the spirit and scope of the invention.

I claim:
1. A coupling means coupled to at least a first fluid conduit and having a cavity therein in fluid communication with said first fluid conduit, said coupling means comprising:
    a. a first member having a tubular body and a first and second end, said first end coupled to said coupling means and said second end disposed within said cavity and forming a sealing surface;
    b. a second member having an elongated cylinderical body with a longitudinal bore extending therethrough, said second member having a first and second end, said first end being larger in diameter than said body, such that an annular collar is formed at the point of change in diameters, the side of the collar adjacent the body of the second member comprising a second sealing surface, said body of said second member having an outer diameter slightly smaller than the inner diameter of said body of said first member, said second member disposed within said first member, such that said first end is disposed near said second end of said first member, said second end of said second member coupled to a second fluid conduit, said second fluid conduit capable of being rotated in relation to said first fluid conduit, said longitudinal bore being in fluid communication with said cavity and said second fluid conduit, such that fluid will pass between said first and second fluid conduits and will fill said cavity creating fluid pressure against said first end of said second member such that said annular collar is urged against said second end of first member thereby forming a seal between said first and second member.

2. The coupling of claim 1 wherein said first member is formed of brass and said second member is formed of stainless steel.

3. The coupling of claim 1 wherein a first and second annular groove are disposed in said body of said second member, said first annular groove for containing lubricant and said second annular groove for receiving an annular sealing ring.

4. The coupling of claim 1 wherein a first end of a tubular sleeve is coupled to said second end of said second member, and a second end of said tubular sleeve is coupled to said second fluid conduit, said tubular sleeve in fluid communication with said second fluid conduit and said longitudinal bore of said second member, said tubular sleeve having a spring means disposed and compressed between said second end of said tubular sleeve and said second end of said second member.

* * * * *